US 012107491B2

(12) United States Patent
Schroth

(10) Patent No.: US 12,107,491 B2
(45) Date of Patent: Oct. 1, 2024

(54) EFFICIENT DC LINK PROCESSING WITHIN A PFC CIRCUIT ARRANGEMENT

(71) Applicant: ebm-papst Mulfingen GmbH & Co. KG, Mulfingen (DE)

(72) Inventor: Sebastian Schroth, Kupferzell (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 95 days.

(21) Appl. No.: 17/717,205

(22) Filed: Apr. 11, 2022

(65) Prior Publication Data

US 2022/0329148 A1 Oct. 13, 2022

(30) Foreign Application Priority Data

Apr. 12, 2021 (DE) ................... 10 2021 108 996.4

(51) Int. Cl.
| | |
|---|---|
| *H02M 1/42* | (2007.01) |
| *H02M 7/217* | (2006.01) |
| *H02M 1/00* | (2006.01) |
| *H02M 1/10* | (2006.01) |
| *H02M 1/32* | (2007.01) |

(52) U.S. Cl.
CPC ....... *H02M 1/4216* (2013.01); *H02M 1/4225* (2013.01); *H02M 7/217* (2013.01); *H02M 1/0085* (2021.05); *H02M 1/10* (2013.01); *H02M 1/325* (2021.05)

(58) Field of Classification Search
CPC .... H02M 1/008; H02M 1/0085; H02M 1/088; H02M 1/14; H02M 1/325; H02M 1/42; H02M 1/4208; H02M 1/4216; H02M 1/4225; H02M 1/4266; H02M 1/10; H02M 7/06; H02M 7/062; H02M 7/12; H02M 7/125; H02M 7/217; H02M 7/2173

See application file for complete search history.

(56) References Cited

U.S. PATENT DOCUMENTS

| | | |
|---|---|---|
| 5,784,269 A | 7/1998 | Jacobs et al. |
| 6,046,915 A | 4/2000 | Jacobs et al. |
| 8,531,854 B2 | 9/2013 | Pan |

(Continued)

FOREIGN PATENT DOCUMENTS

| | | |
|---|---|---|
| DE | 102019201706 A1 | 8/2020 |
| DE | 102019131410 A1 | 5/2021 |

(Continued)

OTHER PUBLICATIONS

Johann W. Kolar; Thomas Friedli; "The essence of three-phase PFC rectifier systems"; Dec. 12, 2011; IEEE; 2011 IEEE 33rd International Telecommunications Energy Conference (INTELEC); pp. 1-27 (Year: 2011).*

(Continued)

*Primary Examiner* — Thienvu V Tran
*Assistant Examiner* — Shahzeb K Ahmad
(74) *Attorney, Agent, or Firm* — Dickinson Wright PLLC

(57) ABSTRACT

A circuit arrangement configured to execute DC link processing with simultaneous reduction of the harmonic components in the input current, i.e., for usability or applicability in different power supply networks, particularly both in single-phase and three-phase networks with the same circuit topology or in the event of the failure of a phase.

18 Claims, 2 Drawing Sheets

(56) References Cited

U.S. PATENT DOCUMENTS

| | | | |
|---|---|---|---|
| 2011/0012579 A1 | 1/2011 | Huang | |
| 2019/0288539 A1* | 9/2019 | Vela Garcia | H02M 1/4216 |
| 2021/0399629 A1* | 12/2021 | Everts | H02M 1/4225 |
| 2022/0021293 A1* | 1/2022 | Esmoris Bertoa | H02M 1/10 |
| 2022/0190744 A1* | 6/2022 | Everts | H02M 7/219 |
| 2023/0223841 A1* | 7/2023 | Everts | H02M 1/4216 |
| | | | 318/504 |

FOREIGN PATENT DOCUMENTS

| | | | |
|---|---|---|---|
| EP | 0696838 A1 | 2/1996 | |
| EP | 2584685 A1 * | 4/2013 | H02J 7/0014 |
| EP | 3509212 A1 | 7/2019 | |

OTHER PUBLICATIONS

Johann W. Kolar; Thomas Friedli; "The Essence of Three-Phase PFC Rectifier Systems—Part I"; IEEE; IEEE Transactions on Power Electronics; vol. 28, Issue: 1; pp. 176-198 (Year: 2013).*

Hyunjae Yoo et al: "A new circuit design and control to reduce input harmonic current for a three-phase ac machine drive system having a very small dc-link capacitor," Applied Power Electronics Conference and Exposition (APEC), 2010 Twenty-Fifth Annual IEEE, IEEE, Piscataway, NJ, USA, Feb. 21, 2010, pp. 611-618, XP031649808, ISBN: 978-1-4244-4782-4.

Kolar, Johann W. et al., "The Essence of Three-Phase PFC Rectifier Systems," Power Electronic Systems Laboratory (PES), ETH Zurich, 8092 Zurich, Switzerland, 978-1-4577-1250-0/11, 2011 IEEE, 28 pages.

* cited by examiner

EFFICIENT DC LINK PROCESSING WITHIN A PFC CIRCUIT ARRANGEMENT

CROSS REFERENCE TO RELATED APPLICATIONS

This application claims the benefit of priority under 35 U.S.C. § 119 to German Patent Application No.: 10 2021 108 996.4 filed Apr. 12, 2021, the contents of which is incorporated herein by reference in its entirety.

FIELD

The invention relates to efficient network-type independent DC link processing with simultaneous reduction of the harmonic components in the input current, i.e., for usability or applicability in different power supply networks. For example, these power supply networks may include both single-phase and three-phase networks with the same circuit topology.

BACKGROUND

The statements in this section merely provide background information related to the present disclosure and several definitions for terms used in the present disclosure and may not constitute prior art.

Various concepts are available for implementing DC link processing on different types of power supply network. For example, a multiphase rectifier bridge circuit for a single-phase input is described in EP 0696838 B1.

A motor drive power conversion system is described in EP 3509212A1 which comprises a filter circuit with a single inductor and a capacitor for each input phase, an active rectifier with silicon carbide rectifier switching devices, a DC link circuit with a film DC link capacitor, an inverter, and a controller for operating the rectifier switching devices at a PWM rectifier switching frequency.

The Vienna rectifier offers another solution that may be utilized. In contrast to the conventional six-pulse bridge circuit (B6) used with 3-phase current, the Vienna rectifier is characterized by a substantially lower harmonic content on the AC side and even supplies twice the DC voltage. Due to the almost sinusoidal current waveform, a smaller line filter and thus a smaller volume for the rectifier are required, especially for higher power outputs.

One objective of the present disclosure consists in designing a 3-phase PFC topology which is such that that the activation can be adapted so as to also enable this topology to be used for a 1-phase mains connection. Such a solution for how operation on a mains phase is possible with a 3-phase Vienna rectifier is disclosed in publication DE 10 2019 131410 A. The drawback of the Vienna rectifier is its cost and the elaborate electronic control circuit that it requires which controls the rectifier using pulse-width modulation (PWM).

Each of the various systems that are known exhibit at least one of the following drawbacks or problems that need to be improved upon or eliminated:

a) Excessive harmonic content of the input current;
b) DC link voltage cannot be processed independently of the network type;
c) Asymmetrical load on the mains phases;
d) No possibility of reducing the electronics variance;
e) High tool and/or development costs for design and manufacture; and
f) High storage costs due to the variety of variants.

SUMMARY

The present disclosure relates to efficient network-type-independent DC link processing with simultaneous reduction of the harmonic components in the input current, i.e., for usability or applicability in different power supply networks, particularly both in single-phase and three-phase networks with the same circuit topology or in the event of the failure of a phase. In particular, a 3-phase PFC topology should be designed in such a way that the control can be adapted so as to also enable this topology to be used for a 1-phase mains connection with the same output power. It is important to note in this regard that the harmonic components on the mains side should be kept low.

An objective of the present disclosure is therefore to overcome the aforementioned drawbacks and provide a solution that may be produced at low cost with which efficient DC link processing can be implemented. Advantageously, the solution may provide a reduction in the harmonic components in the input current that is equally suitable for 3-phase as well as 1-phase operation or can also be operated in the event of a phase failure without the occurrence of substantial harmonics on the mains side.

According to one aspect of the present disclosure, a circuit arrangement having a 3-phase PFC stage with three connection terminals for the connection of the phases for 3-phase operation is provided. This circuit arrangement is configured to be operated in single-phase operation by virtue of the fact that a switching arrangement composed of two independently controllable switches bridged by diodes is connected between a DC link of a 3-phase rectifier circuit and a rectifier-diode bridge with rectifier diodes. The phases (L1, L2, L3) are brought together via respective line paths (LP1, LP2, LP3) at a neutral point, with a bidirectional switch being provided in each line path for the purpose of activating and deactivating the respective phases at the neutral point. The respective switches are opened or closed in the phases in a controlled manner for single-phase PFC operation in order to adjust the current over two active phases sinusoidally and in phase with the grid.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawing, in which.

Figure 1:
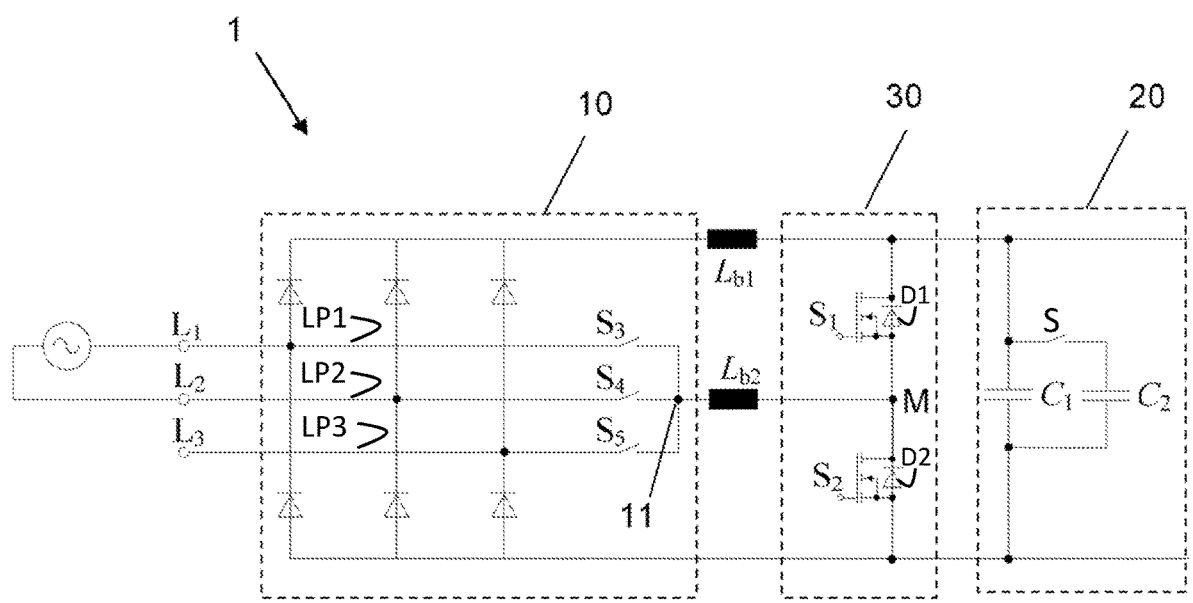
FIG. 1 shows a circuit topology of a 3-phase PFC stage according to the teachings of the present disclosure for realizing a single-phase operation.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or similar parts and structural and/or functional features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

According to one aspect of the present disclosure, one basic idea thereof, is a concept with a 3-phase PFC topology to which three mains phases L1, L2, L3 can be connected for 3-phase operation, each to be operated in single-phase operation, having a 3-phase rectifier circuit that is supplemented with switches for activating and deactivating one or more of the phases L1, L2, L3 and two additional independently controllable switches, with the respective switches being opened or closed in the phases in a controlled manner for single-phase PFC operation in order to adjust the current via two active phases sinusoidally and in phase with the grid.

One relevant aspect or core idea of the present disclosure is that a circuit arrangement, for example the Minnesota rectifier, is made possible according to the concept of the invention in combination with operation in the event of a phase failure Another relevant aspect of the present disclosure is that switching between single-phase and three-phase operation is also activated in the event of power failures or phase failures, and the circuit can therefore be used for this purpose.

According to another aspect of the present disclosure, a circuit arrangement is provided for this purpose having a 3-phase PFC stage with three connection terminals to the connection of the phases L1, L2, L3 for 3-phase operation, the circuit arrangement being designed in the specified manner to also be operated in single-phase operation by virtue of the fact that a switching arrangement composed of two independently controllable, diode-bridged switches "S1, S2" is connected between a DC link of a 3-phase rectifier circuit and a rectifier-diode bridge (comprising the rectifier diodes). The phases L1, L2, L3 are furthermore brought together via respective line paths at a neutral point, and a bidirectional switch being provided in each line path for the purpose of activating and deactivating each of the respective phases at the neutral point. The respective switches are opened or closed in the phases in a controlled manner for single-phase PFC operation in order to adjust the current over two respective active phases sinusoidally and in phase with the grid.

According to another aspect of the present disclosure, a provision is made that only two of the three phases, preferably phases L1, L2, are attached or connected in single-phase PFC operation. Furthermore, a provision may be advantageously made that the DC link, in addition to the main DC link capacitor, also has a capacitor that can be switched on via a switch. Due to the advantageous use of small DC link capacitors in 3-phase operation, it can be advantageous to add a second DC link capacitor when expanding to single-phase operation in order to increase the possible output power of the circuit while simultaneously limiting the voltage ripple in the DC link.

According to another aspect of the present disclosure, a provision is made that an inductor is connected between the neutral point of the phases and a center tap is connected between the switches of said switch arrangement. It is also advantageous if an inductor is likewise connected between the one switch in the circuit arrangement and the rectifier diodes in the rectifier-diode bridge.

According to yet another aspect of the present disclosure, one switch of the switch arrangement has a diode with a conducting direction away from the second switch of the switch arrangement, and the second switch has a diode with a conducting direction away from the first switch, and a center tap is preferably located there between which is connected to the neutral point of the three phases L1, L2, L3.

Still another aspect of the present disclosure relates not only to the circuit as such, but also to the method for operating a 3-phase circuit arrangement as described above in single-phase PFC operation, in which a positive mains half-wave is applied to the phase L1, the corresponding switch in the associated line path is closed. Then, as a result of the switching-on of the second switch, an increasing current is generated from the connection of the phase via the switch via the corresponding rectifier diode to the connection of the phase. As a result of the switching-off of this second switch, this current is conducted via the diode in the first switch (of the switch arrangement) or via the (reverse-) switched switch into the DC link and, via the ground thereof, back to the corresponding rectifier diode of the rectifier-diode bridge to the connection of the second (additional connected) phase.

This may also be done in a similar manner for the negative mains half-wave. When a negative mains half-wave is applied to the second (or additional connected) phase, the switch in the corresponding line path of this phase is closed. Then, as a result of the switching-on of the second switch of the switch arrangement, an increasing current is generated from the connection of the second connected phase L2 via the switch in the line path via the corresponding rectifier diode to the connection of the first phase L1. As a result of the switching-off of the second switch, this current is conducted via the diode D1 in the first switch (of the circuit arrangement) or via the (reverse-)switched switch into the DC link and, via the ground thereof, back to the corresponding rectifier diode of the rectifier-diode bridge to the connection of the first phase L1.

Furthermore, a provision is advantageously made that, before the switching of the switch or switches in the line paths to the neutral point of the phases, the current at the connection of the second phase L2 is first adjusted to a predefined value, which can also be zero.

In another advantageous aspect of the present disclosure, a provision is made that the switch or switches (in the line paths) are clocked at the mains frequency, while the two switches (of the circuit arrangement) are preferably clocked at a substantially higher frequency than the mains frequency, alternatively, these are clocked with pulse-width modulation at a frequency in the range between 20 kHz and 150 kHz.

In order to enable the circuit according to the teachings of the present disclosure to also work in three-phase operation, it is desirable to use a consumer in three-phase operation with constant power, either with the power being constant in single-phase operation or the consumer being instantiated by a resistance.

Further important characteristics and advantages of the invention are now described with associated description of the figures, with reference to the drawings. It is understood that the above-mentioned characteristics, and those to be described hereinafter, are not only applicable in the respective combination indicated, but also in other combinations, or in isolation, without departing from the scope of the present invention.

FIG. 1 shows a circuit arrangement 1 according to the concept of the present disclosure. The circuit arrangement 1 has a 3-phase PFC stage with three connection terminals for the connection of the phases L1, L2, L3 for a 3-phase operation. For single-phase operation, the power consumption from the mains is such that the mains voltage is only connected to the connection terminals L1 and L2 (as shown in FIG. 1) and the third phase L3 is idle or disconnected from the grid.

The circuit arrangement 1 has a DC link 20 and a rectifier diode bridge 10 with six rectifier diodes. Furthermore, a switch arrangement 30 is connected in parallel with the DC link 20. This switch arrangement 30 consists of two switches S1, S2 and the diodes D1, D2 parallel thereto, which are arranged in series with opposite conducting direction. The two switches S1, S2 can be implemented using known technologies, but it is important here that they be present either intrinsically, in the housing of the semiconductor, or externally as a diode D1 or D2 in the reverse direction. The two switches S1, S2 are independently controllable switches and are clocked with pulse-width modulation at a substantially higher frequency than the mains frequency for the purpose of adjusting the current.

As can also be seen in FIG. 1, the phases L1, L2, L3 are brought together at a neutral point 11 via respective line paths LP1, LP2, LP3, and a bidirectional switch S3, S4, S5 is arranged in each of the three line paths LP1, LP2, LP3. These are clocked at mains frequency specifically in order to activate and deactivate the phases L1 and L2 at the neutral point 11.

In addition to the main DC link capacitor C1, the DC link 20 also has a capacitor C2 that can be connected via a switch S and is connected in parallel with the capacitor C1. The depicted inductors $L_{b1}$, $L_{b2}$ are also provided.

Figure 2:
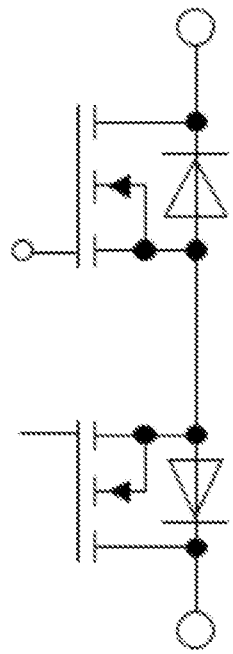
FIG. 2 shows a first option for the implementation of the bidirectional switches in the line paths of the phases to the neutral point.
Figure 3:
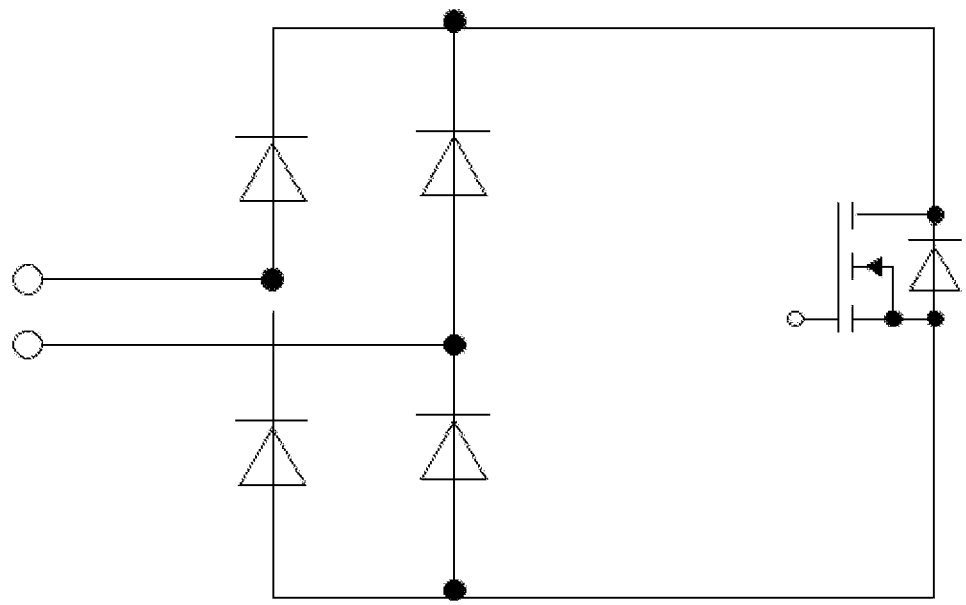
FIG. 3 shows an alternative option for the implementation of the bidirectional switches in the line paths of the phases to the neutral point.

FIGS. 2 and 3 show options for the implementation of the bidirectional switches S3, S4, S5 in the line paths of the phases L1, L2, L3 to the neutral point 11. The switches S3, S4, S5 are embodied as bidirectional switches. This can be achieved both as an insulated-gate bipolar transistor (IGBT) and as a metal—oxide—semiconductor field-effect transistor (MOSFET).

In the case of a positive mains half-wave, the switch S3 is closed via this mains half-wave and, after the switch S2 is switched on, an increasing current is generated as follows: from the phase terminal of L1 via S3, $L_{b2}$ via the switch S2, and the rectifier diode to the phase terminal L2. When switch S2 is switched off, this current commutates via the diode into the switch S1 or via the reverse switch into the DC link (current flow: L1-S3-$L_{b2}$-S1-C1-rectifier diode-L2).

In the case of a negative mains half-wave, the behavior is identical to that with a positive mains voltage, only with the opposite sign with regard to the mains current.

Upon switching on the switch S2: current flow L2-S4-$L_{b2}$-S2-rectifier diode-L1 and, upon switching off the switch S2: current flow L2-S4-$L_{b2}$-S1-C1-rectifier diode-L1.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. Thus, the invention is not limited in its execution to the abovementioned preferred exemplary embodiments. Rather, a number of variants are conceivable that make use of the illustrated solution even in the form of fundamentally different embodiments. All such modifications and variations are within the scope of the invention as determined by the appended claims when interpreted in accordance with the breadth to which they are fairly, legally, and equitably entitled.

The invention claimed is:

1. A circuit arrangement comprising a 3-phase PFC stage with three connection terminals to connect a first phase L1, a second phase L2, and a third phase L3 that provides an output power in 3-phase operation, the circuit arrangement being configured to also operate in single-phase operation by a switching arrangement composed of a first independently controllable switch S1 bridged by a first diode D1 and a second independently controllable switch S2 bridged by a second diode D2 connected between a DC link of a 3-phase rectifier circuit and a rectifier-diode bridge with rectifier diodes, wherein the first phase L1, the second phase L2, and the third phase L3 are brought together via respective a first line path LP1, a second line path LP2, and a third line path LP3 at a neutral point, wherein a first bidirectional switch S3, a second bidirectional switch S4, and a third bidirectional switch S5 is provided in each of the first line path LP1, the second line path LP2, and the third line path LP3 for the purpose of activating and deactivating the respective first phase L1, the second phase L2, and the third phase L3 at the neutral point, wherein the first bidirectional switch S3, the second bidirectional switch S4, and the third bidirectional switch S5 are opened or closed in the phases in a controlled manner for single-phase PFC operation in order to adjust a current over two active phases sinusoidally and in phase with a grid; the single-phase PFC operation providing the same output power as the 3-phase operation;

wherein the DC link, in addition to a main DC link capacitor C1, also has a capacitor C2 that can be additionally connected via a switch S;

wherein, prior to the first bidirectional switch S3, the second bidirectional switch S4, and/or the third bidirectional switch S5, being opened or closed for single-phase PFC operation, the current at the connection of the second phase L2 is first adjusted to a predefined value, which can also be zero.

2. The circuit arrangement as set forth in claim 1, wherein during single-phase PFC operation, only two of the first phase L1, the second phase L2, or the third phase L3 are attached or connected.

3. The circuit arrangement as set forth in claim 2, wherein the first phase L1 and the second phase L2 are attached or connected.

4. The circuit arrangement as set forth in claim 1, wherein an inductor $L_{b2}$ is connected between the neutral point of the first phase L1, the second phase L2, and the third phase L3 and a center tap between the first independently controllable switch S1 and the second independently controllable switch S2.

5. The circuit arrangement as set forth in claim 1, wherein an inductor $L_{b1}$ is connected between the first independently controllable switch S1 of the circuit arrangement and the rectifier diodes of the rectifier-diode bridge.

6. The circuit arrangement as set forth in claim 1, wherein the first diode D1 has a conducting direction away from the second independently controllable switch S2 and the second diode D2 has a conducting direction away from the first independently controllable switch S1.

7. A method for operating a circuit arrangement as set forth in claim 1 in single-phase PFC operation, wherein, when a positive mains half-wave is applied to the first phase L1, the first bidirectional switch S3 in the corresponding first line path LP1 is closed and then, as a result of the switching-on of the second independently controllable switch S2 of the switch arrangement, an increasing current is generated from the connection of the first phase L1 via the first bidirectional switch S3 via the corresponding rectifier diode to the connection of the second phase L2 and then, as a result of the switching-off of the second independently controllable switch S2, this current is conducted via the first diode D1 in the first independently controllable switch S1 or via reversing the current through the first independently controllable switch S1 into the DC link and, via ground thereof, back to the corresponding rectifier diode of the rectifier-diode bridge to the connection of the second phase L2.

8. The method as set forth in claim 7 for operating the circuit arrangement in single-phase PFC operation, wherein, when a negative mains half-wave is applied to the second phase L2, the second bidirectional switch S4 in the corresponding second line path LP2 is closed and then, as a result of the switching-on of the second independently controllable switch S2 of the switch arrangement, an increasing current is generated from the connection of the second phase L2 via the second bidirectional switch S4 via the corresponding rectifier diode to the connection of the first phase L1 and then, as a result of the switching-off of the second independently controllable switch S2, this current is conducted via the first diode D1 in the first independently controllable switch S1 or via reversing the current through the first independently controllable switch S1 into the DC link and, via ground thereof, back to the corresponding rectifier diode of the rectifier-diode bridge to the connection of the first phase L1.

9. The method as set forth in claim 8, wherein, before the switching of the first bidirectional switch S3, the second bidirectional switch S4, and/or the third bidirectional switch S5, the current at the connection of the second phase L2 is first adjusted to a predefined value, which can also be zero.

10. The method as set forth in claim 9, wherein the first bidirectional switch S3, the second bidirectional switch S4, and/or the third bidirectional switch S5 are clocked at the mains frequency.

11. The method as set forth in claim 10, wherein the first independently controllable switch S1 and the second independently controllable switch S2 are clocked at a substantially higher frequency than the mains frequency, these being clocked particularly with pulse-width modulation at a frequency in the range between 20 KHz and 150 KHz.

12. The method as set forth in claim 7, wherein the first bidirectional switch S3, the second bidirectional switch S4, and/or the third bidirectional switch S5 are clocked at the mains frequency.

13. The method as set forth in claim 7, wherein the first independently controllable switch S1 and the second independently controllable switch S2 are clocked at a substantially higher frequency than the mains frequency, these being clocked particularly with pulse-width modulation at a frequency in the range between 20 KHz and 150 KHz.

14. The circuit arrangement as set forth in claim 1, characterized in that the first diode D1 has a conducting direction away from the second independently controllable switch S2 and the second diode D2 has a conducting direction away from the first independently controllable switch S1, a center tap being disposed there between which is connected to the neutral point.

15. The circuit arrangement as set forth in claim 1, wherein an inductor $L_{b2}$ is connected between the neutral point of the first phase L1, the second phase L2, and the third phase L3 and a center tap between the first independently controllable switch S1 and the second independently controllable switch S2.

16. The circuit arrangement as set forth in claim 15, wherein an inductor $L_{b1}$ is connected between the first independently controllable switch S1 of the circuit arrangement and the rectifier diodes of the rectifier-diode bridge.

17. The circuit arrangement as set forth in claim 16, wherein the first diode D1 has a conducting direction away from the second independently controllable switch S2 and the second diode D2 has a conducting direction away from the first independently controllable switch S1, a center tap M being preferably disposed there between which is connected to the neutral point.

18. The circuit arrangement as set forth in claim 1, wherein an inductor $L_{b1}$ is connected between the first independently controllable switch S1 of the circuit arrangement and the rectifier diodes of the rectifier-diode bridge.

* * * * *